United States Patent [19]
Saito

[11] Patent Number: 5,649,218
[45] Date of Patent: Jul. 15, 1997

[54] DOCUMENT STRUCTURE RETRIEVAL APPARATUS UTILIZING PARTIAL TAG-RESTORED STRUCTURE

[75] Inventor: Kazuo Saito, Kanagawa, Japan

[73] Assignee: Fuji Xerox Co., Ltd., Tokyo, Japan

[21] Appl. No.: 503,691

[22] Filed: Jul. 18, 1995

[30] Foreign Application Priority Data

Jul. 19, 1994 [JP] Japan .................. 6-187866

[51] Int. Cl.$^6$ .................. G06F 17/30; G06F 17/21
[52] U.S. Cl. .................. 395/774; 395/601; 395/761; 395/776; 395/935
[58] Field of Search .................. 395/774, 761, 395/776, 779, 784, 785, 935, 943, 601, 613

[56] References Cited

U.S. PATENT DOCUMENTS

| | | | |
|---|---|---|---|
| 5,079,700 | 1/1992 | Kozoll et al. | 395/793 |
| 5,113,341 | 5/1992 | Kozol et al. | 395/793 |
| 5,173,853 | 12/1992 | Kelly et al. | 395/792 |
| 5,276,793 | 1/1994 | Borgendale et al. | 395/774 |
| 5,291,602 | 3/1994 | Barker et al. | 395/786 |
| 5,499,329 | 3/1996 | Motoyama et al. | 395/774 |
| 5,548,508 | 8/1996 | Nagami | 395/752 |
| 5,583,762 | 12/1996 | Shafer | 395/794 |
| 5,587,902 | 12/1996 | Kugimiya | 395/752 |

FOREIGN PATENT DOCUMENTS 5-135054  6/1993  Japan .

Primary Examiner—Paul V. Kulik
Attorney, Agent, or Firm—Finnegan, Henderson, Farabow, Garrett & Dunner, L.L.P.

[57] ABSTRACT

A document data storing section stores document data which incorporates tags that separate the document data into data portions to express its structure. Part of the tags are omissible. A type storing section stores a pattern of the document data structure expressed by the tags. An essential structure searching means identifies a minimum necessary range of the document data in which range omitted tags should be restored, based on a structure retrieving instruction including an object structure. A structure restoring section restores the omitted tags in the minimum necessary range to thereby produce a partial retrieved data. A structure retrieving section retrieves a tag of the object structure from the partial retrieved data.

3 Claims, 10 Drawing Sheets

| ELEMENT NAME | LOWER ELEMENT | OMISSION OF START TAG | OMISSION OF END TAG |
|---|---|---|---|
| doc | chap* | NOT OMISSIBLE | NOT OMISSIBLE |
| chap | header, (para I fig)*, chap* | NOT OMISSIBLE | NOT OMISSIBLE |
| header | #PCDATA | OMISSIBLE | OMISSIBLE |
| para | #PCDATA | NOT OMISSIBLE | OMISSIBLE |
| fig | header, fig_body | NOT OMISSIBLE | OMISSIBLE |
| fig_body | EMPTY | NOT OMISSIBLE | OMISSIBLE |

FIG. 13

```
<!ELEMENT doc     - -  chap*                        >
<!ELEMENT chap    - -  (header, (para | fig)*, chap*) >
<!ELEMENT header  0 0  (#PCDATA)                    >
<!ELEMENT para    - 0  (#PCDATA)                    >
<!ELEMENT fig     - 0  (header, fig_body)           >
<!ELEMENT fig_body - 0 (EMPTY)                      >
```

FIG. 14

```
<doc>
  <chap> What is SGML?
    <para> SGML is an international standard which was set in
           1986 to provide for the format of expressing a
           document, and is called ISO 8879.
    <para> In recent years, SGML has spread principally in the
           U.S.
  <chap> Document expression by SGML
    <para> According to SGML, a document structure is
           expressed by embedding tags called a start tag
           and an end tag in a text.
    <fig> SGML document example <fig_body>
  </chap>
</chap>
</doc>
```

FIG. 15

```
<doc>
    <chap> <header> What is SGML? </header>
        <para> SGML is an international standard which was set in
               1986 to provide for the format of expressing a
               document, and is called ISO 8879. </para>
        <para> In recent years, SGML has spread principally in the
               U.S. </para>
        <chap> <header> Document expression by SGML </header>
            <para> According to SGML, a document structure is
                   expressed by embedding tags called a start tag
                   and an end tag in a text. </para>
            <fig> <header> SGML document example </header> <fig_body> </fig_body> </fig>
        </chap>
    </chap>
</doc>
```

150

DOCUMENT STRUCTURE RETRIEVAL APPARATUS UTILIZING PARTIAL TAG-RESTORED STRUCTURE

BACKGROUND OF THE INVENTION

1. Field of the Invention

The present invention relates to a structure retrieval apparatus in which tags (part of the tags are omissible) are inserted in data to discriminate portions of the data to thereby express a structure, and the structure of the data is searched at high speed. For example, the invention is applicable to an apparatus for searching the structure of a structured document in which tags are inserted in a text to divide it into document elements.

2. Description of the Related Art

Conventionally, in document editing apparatuses for document processing, such as document editing apparatuses (word processors) in workstations, in order to efficiently prepare a document, attempts have been made to structure and edit the document by preparing in advance a plurality of document parts such as headers and paragraphs and by determining relationships among the respective document parts.

As examples of structured documents which incorporate the concept of a structure with respect to a document, structured documents conforming to international standards of ODA (ISO 8613: Open Document Architecture) and SGML (ISO 8879: Standard Generalized Markup Language) are known. As for an example of a document processing method using a structured document conforming to ODA standards, reference is made to Japanese Unexamined Patent Publication No. Hei. 5-135054 entitled "Document Processing Method."

Structured documents conforming to SGML, which have high affinity with conventional text processing systems, have found widespread use principally in the United States, and have already entered a stage of practical use. This is because a conventional text processing system is sufficiently capable of realizing the structured document since the technique of the structured document conforming to SGML is a technique whereby the document text is partially classified (e.g., divided as document parts) by inserting marks called tags into the document text, the document is structured by defining relationships among the divisions, and a tree-structured document structure is thereby represented.

Next, by citing a structured document conforming to SGML as an example, a description will be given of an example of processing a structured document provided with marks. In a structured document conforming to SGML, a pattern of a document structure is provided in advance, and the structure of the document is constrained within the range of the provided pattern. Such a pattern of the document structure is called a document type definition (DTD) in SGML.

In a structured document conforming to SGML, a document type definition is first set forth to regulate the structure of the document. Next, to represent the structure, marks called tags are inserted in the document text, and the document text is partially classified by the tags. For example, one paragraph in a document is represented as shown below by using a tag <para> having a name "para."

"<para>This is one paragraph.</para>"

The tag <para> here means a start of the paragraph, and is called a start tag. The tag </para> means an end of the paragraph, and is called an end tag. That is, in this example, the paragraph is marked by using two tags, the start tag <para> and the end tag </para> having a name "para," and a part of the document text is thereby partially classified. In other words, the portion of the text sandwiched by the two tags indicates the content portion of the structure indicated by the tags.

The tags which are given their names are respectively distinguished, and their structural functions are defined in the document type definition. In this context, the tag represents a structure of the document. Accordingly, a structure of the structured document (an SGML-conformable document) referred to hereafter shall mean that it is synonymous with a tag insofar as confusion does not occur.

In addition, some tags are omissible in the structured document conforming to SGML (hereafter abbreviated as a SGML document). In that case, whether the omission is possible or not is designated by the document type definition (DTD). The designation as to whether the omission is possible or not is given independently for each start tag and each end tag. For example, the end tag </para> is omissible in a case where a designation to that effect is given in the document type definition, in which case the above-described example can be written as "<para>This is one paragraph."

The document type definition of the SGML document is written as shown in FIG. 13, for example, In the document structure constrained by a document type definition 130 shown in FIG. 13, it is defined that the respective tags, including the start tag whose name is "header," the end tag of "header," the end tag of "paragraph," the end tag of "figure," and the end tag of "fig_body," are omissible.

Next, a specific description will be given of the contents of the document type definition 130 shown in FIG. 13. The document type definition (DTD) here is written in conformity with the representation method of SGML. The initial symbol "<!" on each line of the content of the document type definition is a markup declaration delimiter, and an ensuing "ELEMENT" which continues without a space is an element declaration keyword. In other words, the initial word "<!ELEMENT" in the line constitutes a reserved word for designating the content of its structure (a lower structure) by an ensuing description. Then, the names (doc, chap, header, para, fig, and fig_body) of items described next represent the names of object tags.

Ensuing symbols ("- - ,""- O,""O O," and so on) are symbols which represent whether the object tags of the items are respectively omissible in the order of the start tag and the end tag. The symbol "-" means that the tag is not omissible, while the symbol "O" means that the tag is omissible. For instance, if the symbols in a given line are "- O," it means that the start tag is not omissible, and the end tag is omissible.

Items that further follow provide for definitions representing the lower structure following the tag. The symbol "," means that items (tags) appear in order, the symbol "|" means that it suffices if either item is present, and the symbol "*" means that the item (tag) is repeated a 0 time or more. In addition, the symbol "?" means that the item (tag) may or may not be present.

According, in a case where the lower structure following the tag is defined as "chap_header, para*, chap*)," the lower structure according to the definition means that "first, there is a chapter header, followed by a repetition of a paragraph a 0 time or more, further followed by a repetition of a chapter a 0 time or more." To cite a specific example, in a case where the lower structure following the tag is defined as "header, (para|fig)*, chap*)" as in the second line of the document type definition 130 shown in FIG. 13, the lower structure according to the definition means that "there is a header, followed by a repetition of a paragraph or a figure a 0 time or more, further followed by a repetition of a chapter a 0 time or more."

In addition, "#PCDATA" in the lower structure following the tag and written in the third and fourth lines is one of the reserved words of SGML, and means in the definition of the structure that its content is character data. Accordingly, in the example of the document type definition 130, "#PCDATA" means that character data follows the tags on the "header" and the "para" which constitute the "chap."

That is, in the pattern of the document structure according to the document type definition (DTD) shown in FIG. 13, the relevant document is one which starts with a tag "<doc>" constituted by a repetition of a "chap" (chapter), and that "chap" has a "para" (paragraph) or a "fig" (figure) which is repeated a 0 time or more following the "header," further followed by a repetition of a "chap" a 0 time or more. In addition, the "header" and the "para" in this example are constituted by character data.

As detailed rules, it is defined that the content of the "fig" in the document structure is comprised of the "header" and the "fig_body" (figure body) that follows, and the "fig_body" is defined as having not lower structure ("EMPTY") since, for instance, an external image file is referred to. In addition, as for the designation concerning whether the tags of the structure are omissible or not, it is defined that the tags of the "doc" and the "chap" are not omissible, that, as for the tags of the "para," the "fig," and the "fig_body," only their end tags are omissible, and that, as for the "header," its both tags are omissible.

An example of an actual document conforming to such a document type definition (hereafter such a document will be referred to as an object document) is, for example, an SGML document 140 shown in FIG. 14. Incidentally, in the document shown in FIG. 14, the document is represented by varying the indentation depending on the depth of the structure of the document, but this representation is provided only for the purpose of facilitating viewing in the light of explanation of an example of the document of a structured document. Actual documents are not indented in many cases.

Referring to FIG. 14, as can be appreciated from the SGML document 140 of the structured document in this example, as for the tags representing the "header" in the lower structure constituting the "chap," both their start tag and end tag do not appear in the document. In actuality, however, the start tag "<header>" between the tag "<chap>" and its content portion "What is SGML?" in the second line is omitted. Incidentally, whether or not such a tag is omitted cannot be determined unless reference is had to the aforementioned document type definition 130. Accordingly, the accurate structure of the object document cannot be understood unless it is considered in combination with the document type definition to which the object document constantly conforms.

Since tags are thus omitted in an SGML document, processing for analyzing the document structure (syntactic analysis processing using an SGML parser) is first required when processing the SGML document. In the processing of analysis of a document structure, processing is mainly carried out in which collation is made with a document type definition while analyzing the object document, and the omitted tags in the object document are restored. In the syntactic analysis processing which is executed in actual document processing, other processing (processing such as restoration of attributes and expansion of entities) is also carried out. Since attention is focused herein on the structure restoration processing alone, a description will be given hereafter under the assumption that the syntactic analysis processing is simply equivalent to structure restoration processing.

If restoration processing of tags (structures) is carried out with respect to the SGML document 140 illustrated in FIG. 14 as the object document, an SGML document 150 such as the one shown in FIG. 15 is obtained. In the SGML document 150 shown in FIG. 15, the underlined portions indicate restored tags (structures). In this object document, the omitted tags are restored by collating with the document type definition 130 such as the one shown in FIG. 13. That is, in view of the rule on the structure of "chap," the tag "<header>" must always exist next to the tag "<chap>," so that the tag "<header>" is first restored next to the tag "<chap>." Similarly, since the tag "<header>" must always exist next to the tag "<fig>," so that the tag "<header>" is restored next to the tag "<fig>." In addition, since their end tags are omitted, their respective end tags "</header>," "</para>" and the like are restored next to their content portions (at positions behind their corresponding ensuing tags). Thus, the respective tags (structures) are restored as underlined in the drawing.

Next, a description will be given of processing in a case where a structure is retrieved in the SGML document 150 in which the tags are restored and its structure is represented. In a structured document, when document editing is carried out, not only the retrieval of mere character strings of the text but also the retrieval of structures making use of the document structure becomes important processing in document processing. This is because in cases where processing of a structured document is performed, edit processing which makes use of structures of the document structure is actively undertaken.

In the retrieval of a structured document, not only the conventional retrieval of character strings (text retrieval) but also retrieval making active use of the structures is effectively utilized. For example, in a case where an attempt is made to retrieve a figure related to SGML in a document, according to conventional retrieval processing, full-text retrieval (character string retrieval) is carried out with respect to the document, and the "related figure" is located from the character string in the text.

However, if the structure itself of the document structure is used for retrieval, it becomes possible to effect retrieval by pointing to a structure in the document structure as in "a figure in which SGML is included in the title of the figure" or "a header in the lower structure of a figure," thereby making it possible to effect retrieval by narrowing down the object. In addition, in retrieval processing in that case, since retrieval can be effected by narrowing down the object range in accordance with the structure of the document, there is an advantage in that the efficiency of retrieval processing improves.

As described before, since the SGML document has a document architecture of a type in which tags for marking are embedded in the text, its affinity with a conventional text processing system is high. That is, since the structures are represented by tags for marking, it is unnecessary to use a special apparatus or processing program when retrieving the structure, and it is possible to retrieve the document structure by using character-string retrieval for retrieving a character string representing the symbols of the tags. In other words, the SGML document can be prepared by using a conventional text processing apparatus (such as a document editor), and structure retrieval can be basically carried out by retrieving the start tags and their corresponding end tags by using the conventional text retrieving technique for character-string retrieval in which character strings of the tags are retrieved.

As described above, in the SGML document, the tags (structures) are omitted according to the designation of a document type definition. Accordingly, there are cases where omissible tags are designated as objects to be retrieved. For example, if a description is given by citing the SGML document 140 illustrated in FIG. 14, in a case where the user performs retrieval by designating the tag "<header>" by desiring to retrieve the content of the structure called "header" from the document structure, this tag is omitted in the original SGML document, so that the conventional text retrieval method cannot be used unless the restoration processing of the tag is conducted beforehand.

Accordingly, in the structure retrieval of a representation format such as an SGML document, structure restoration processing for restoring the omitted structure (tag) generally becomes indispensable. That is, before the structure subject to retrieval is searched for, the structure (tag) is restored by conducting the structure restoration processing with respect to the entire object document, and processing for searching for the tag subject to retrieval is then carried out by text retrieval.

Since the structure restoration processing must be carried out while referring to the document type definition of the object document, complicated processing is required, and a long processing time is required, with the result that it takes time in retrieval processing. The longer the object document is, the more time it takes in the restoration processing of the structure, and the more retrieval time increases. For this reason, such processing presents a problem in practical applications when handling an SGML document as a structured document.

In contrast, when, for instance, the object document (SGML document) is stored, it is possible to use a technique whereby the results of restoration processing of the tags omitted are stored in advance after being converted into an internal data structure. If this technique is used, the structure restoration processing during retrieval of the structure becomes unnecessary, so that the retrieval processing speed can be improved.

With the above-described technique, however, since the object document must be stored after being converted into the internal data structure, there is a drawback in that a large storage area of such as an external storage device is required. In addition, when documents are frequently exchanged with external documents, processing for converting the documents into internal data structures (structure restoration processing) is, in fact, required on each such occasion, with the result that there arises a drawback that the overall throughput cannot be improved. Namely, although the above-described technique is effective for a large-scale document database for managing object documents in one place, it cannot be generally said that the technique provides an effective method when processing a group of small-scale structured documents.

SUMMARY OF THE INVENTION

To solve the above problems, it is an object of the present invention to provide a structure retrieval apparatus in which tags (part of the tags are omissible) are inserted in data to discriminate portions of the data to thereby express a structure, and the structure of the data is searched at high speed.

To this end, in accordance with a first aspect of the present invention, there is provided a structure retrieval apparatus comprising: data storing means (11) for storing data in which tags are partially omissible when the tags are inserted in the data, and the data is partially discriminated by the tags so as to represent a structure; type storing means (12) for storing a pattern of the structure represented by the tags; restoration processing means (13) for restoring an omitted portion of the tag in the data stored in the data storing means on the basis of the pattern of the structure; and structure retrieving means (14) for controlling the restoration processing means when a designated structure is retrieved, for effecting processing of partially restoring the structure with respect to necessary and minimum partial data concerning the tag of the structure subject to retrieval, and for retrieving the tag of the structure subject to retrieval on the basis of the restored partial data.

In accordance with a second aspect of the present invention, there is provided a structure retrieval apparatus comprising: data storing means (111) for storing data in which tags are partially omissible when the tags are inserted in the data, and the data is partially discriminated by the tags so as to represent a structure; type storing means (112) for storing a pattern of the structure represented by the tags; restoration processing means (113) for restoring an omitted portion of the tag in the data stored in the data storing means on the basis of the pattern of the structure; structure retrieving means (114) for retrieving a tag of a designated structure; essential-structure searching means (115) for searching the structure of the pattern for a tag which is located at a higher level than that of the structure subject to retrieval and is not omissible, in a case where the tag concerning the structure subject to retrieval is omissible; and control means (116) for controlling the restoration processing means so as to effect partial structure restoration processing on the basis of necessary and minimum partial data concerning the tag by using the tag found by the essential-structure searching means, and for controlling the structure retrieving means so as to retrieve the structure subject to retrieval.

In accordance with a third aspect of the present invention, there is provided a structure retrieval apparatus comprising: data storing means (121) for storing data in which tags are partially omissible when the tags are inserted in the data, and the data is partially discriminated by the tags so as to represent a structure; type storing means (122) for storing a pattern of the structure represented by the tags; restoration processing means (123) for restoring an omitted portion of the tag in the data stored in the data storing means on the basis of the pattern of the structure; structure retrieving means (124) for retrieving a tag of a designated structure on the basis of the data stored in the data storing means; essential-structure searching means (125) for searching the structure of the pattern for a tag which is located at a higher level than that of the structure subject to retrieval and is not omissible, in a case where the tag concerning the structure subject to retrieval is omissible; and control means (126) for controlling the restoration processing means so as to effect structure restoration processing with respect to necessary and minimum partial data concerning the tag by using the tag found by the essential-structure searching means, and for replacing corresponding data stored in the data storing means by restored data.

In the structure retrieval apparatus in accordance with the first aspect of the present invention, the data storing means

(11) stores data in which tags are partially omissible when the tags are inserted in the data, and the data is partially discriminated by the tags so as to represent a structure. In addition, the type storing means (12) stores a pattern of the structure represented by the tags. The restoration processing means (13) restores an omitted portion of the tag in the data stored in the data storing means on the basis of the pattern of the structure.

When a structure designated by, for instance, a user is retrieved with respect to the data stored in the data storing means, the structure retrieving means (14) controls the restoration processing means, effects processing of partially restoring the structure with respect to necessary and minimum partial data concerning the tag of the structure subject to retrieval, and retrieves the tag of the structure subject to retrieval on the basis of the restored partial data.

As a result, since the structure retrieving means (14) retrieves the tag subject to retrieval by performing the processing for partially restoring the structure with respect to only necessary and minimum partial data concerning the tag of the structure subject to retrieval, the substantial retrieval time can be shortened. For this reason, it is possible to effect structure retrieval at high speed.

In the structure retrieval apparatus in accordance with the second aspect of the present invention, the data storing means (111) similarly stores data in which tags are partially omissible when the tags are inserted in the data, and the data is partially discriminated by the tags so as to represent a structure. The type storing means (112) stores a pattern of the structure represented by the tags. The restoration processing means (113) for restores an omitted portion of the tag in the data stored in the data storing means on the basis of the pattern of the structure When a structure designated by, for instance, a user is retrieved from the data stored in the data storing means, the structure retrieving means (114) retrieves a tag of the designated structure, and at that time the essential-structure searching means (115) searches the structure of the pattern for a tag which is located at a higher level than that of the structure subject to retrieval and is not omissible, in a case where the tag concerning the structure subject to retrieval is omissible. Then, the control means (116) controls the restoration processing means so as to effect partial structure restoration processing on the basis of necessary and minimum partial data concerning the tag by using the tag found by the essential-structure searching means, and controls the structure retrieving means so as to retrieve the structure subject to retrieval.

Since the tag subject to retrieval can be retrieved as the control means (116) controls the restoration processing means (113) by using the tag found by the essential-structure searching means (115) and by merely effecting partial structure restoration processing on the basis of necessary and minimum partial data concerning the tag, the substantial retrieval time can be shortened. For this reason, it is possible to effect structure retrieval at high speed.

In the structure retrieval apparatus in accordance with the third aspect of the present invention, the data storing means (121) similarly stores data in which tags are partially omissible when the tags are inserted in the data, and the data is partially discriminated by the tags so as to represent a structure. The type storing means (122) stores a pattern of the structure represented by the tags. The restoration processing means (123) for restores an omitted portion of the tag in the data stored in the data storing means on the basis of the pattern of the structure.

The structure retrieving means (124) retrieves a tag of a designated structure on the basis of the data stored in the data storing means (121). When so doing, the essential-structure searching means (125) searches the structure of the pattern for a tag which is located at a higher level than that of the structure subject to retrieval and is not omissible, in a case where the tag concerning the structure subject to retrieval is omissible. Then, the control means (126) controls the restoration processing means (123) so as to effect structure restoration processing with respect to necessary and minimum partial data concerning the tag by using the tag found by the essential-structure searching means, and replaces corresponding data stored in the data storing means by restored data.

As a result, since the data in which the tags subject to retrieval are partially restored are consecutively replaced and are stored in the data storing means (121), the structure retrieving means (124) subsequently retrieves the tag of the designated structure on the basis of the data stored in the data storing means (121). In this case as well, since the tag subject to retrieval can be retrieved as the control means (126) controls the restoration processing means (123) by using the tag found by the essential-structure searching means (125) and by merely effecting partial structure restoration processing on the basis of necessary and minimum partial data concerning the tag, the substantial retrieval time can be shortened. For this reason, it is possible to effect structure retrieval at high speed. In addition, since the data in which the tags subject to retrieval are partially restored are consecutively replaced and are stored in the data storing means (121), in structure retrieval which is subsequently conducted, there are cases where it is unnecessary to carry out the structure restoration processing. Consequently, there is an additional advantage in which the substantial retrieval time can be shortened.

Thus, in accordance with the structure retrieval apparatus in accordance with the present invention, a structure retrieval apparatus is provided in which tags are inserted in data, the data is partially discriminated by the tags so as to represent a structure, and the structure can be retrieved at high speed from the data in which the tags are partially omissible. In addition, a structure retrieval apparatus is provided in which, by converting the data into document text, tags are inserted into the text, the text is divided into document elements, and the structure can be retrieved at high speed from the structured document.

The above and other objects, features and advantages of the present invention will become more apparent from the following detailed description of the invention when read in conjunction with the accompanying drawings.

BRIEF DESCRIPTION OF THE DRAWINGS

FIG. 13 is a diagram illustrating an example of the document type definition (DTD) of SGML;

FIG. 14 is a diagram explaining an example of an SGML document in which tags are omitted; and FIG. 15 is a diagram explaining an example of the SGML document in which the omitted tags are restored.

DESCRIPTION OF THE PREFERRED EMBODIMENTS

Figure 1:
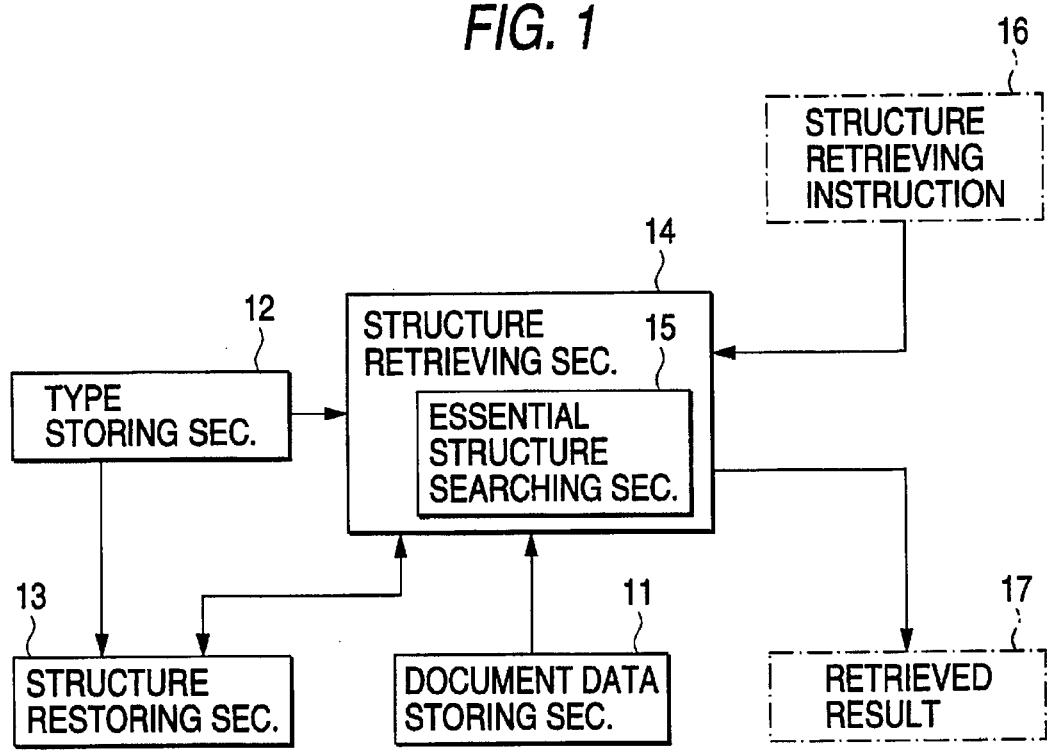
FIG. 1 is a block diagram illustrating a configuration of a structure retrieval apparatus in accordance with a first embodiment of the present invention.

Referring now to the accompanying drawings, a description will be given of the embodiments of the present invention. FIG. 1 is a block diagram illustrating a configuration of a structure retrieval apparatus in accordance with a first embodiment of the present invention. In FIG. 1, reference numeral 11 denotes a document-data storing section; 12, a type storing section; 13, a structure restoring section; 14, a structure retrieving section; 15, and an essential-structure searching section. Numeral 16 denotes a structure retrieving instruction for retrieving a structure, and 17 denotes a retrieved result.

Document data for obtaining a structured document is stored in the document-data storing section 11, wherein the structured document is formed such that tags are inserted in the text data of a document, and the document text is partially distinguished (as document parts) by the tags. This document data is similar to, for instance, the SGML document 140 (FIG. 14) described before, and is the document data of a document architecture in which the structure of the document is represented by tags, and the tags are partially omissible. As a pattern of the structure represented by tags, a document type definition 130, such as the one shown in FIG. 13, is stored in the type storing section 12 in correspondence with the document data of the structured document. In addition, the structure restoring section 13 restores omitted portions of the tags in the document data stored in the document-data storing section 11, on the basis of the pattern (document type definition) stored in the type storing section 12.

Upon receiving the structure retrieving instruction 16 from a user or another apparatus, the structure retrieving section 14 effects retrieval processing of the structure with respect to the document data stored in the document-data storing section 11. At that time, by controlling the structure restoring section 13, the structure retrieving section 14 effects processing for partially restoring the structure with respect to necessary and minimum partial data concerning the tags of a structure subject to retrieval, and retrieves the tags of the structure subject to retrieval by means of the restored partial structure.

This structure retrieving section 14 includes the essential-structure searching section 15 as a part of its processing function, and the essential-structure searching section 15 searches for a necessary and minimum portion concerning the tags of the structure subject to retrieval. Subsequently, the structure restoring section 13 partially restores the structure with respect to the found necessary and minimum document data, and processing is then effected for searching for the object structure (tags) in the document by means of the restored partial structure. The pattern (document type definition) of the structure stored in the type storing section 12 is referred to at the time of structure restoration processing by the structure restoring section 13, and is also referred to when the essential-structure searching section 15 searches for the necessary and minimum portion concerning the tags of the structure subject to retrieval.

In the above-described manner, the structure retrieving section 14 effects processing for partially restoring the structure with respect to only the necessary and minimum partial data concerning the tags of the structure subject to retrieval, retrieves the tags (structure) subject to retrieval, and outputs the retrieved result 17. For this reason, as for the retrieval of the structure on the basis of the document data of the structured document here, the substantial retrieval time can be shortened, and the retrieval of the structure can be effected at high speed.

Figure 2:
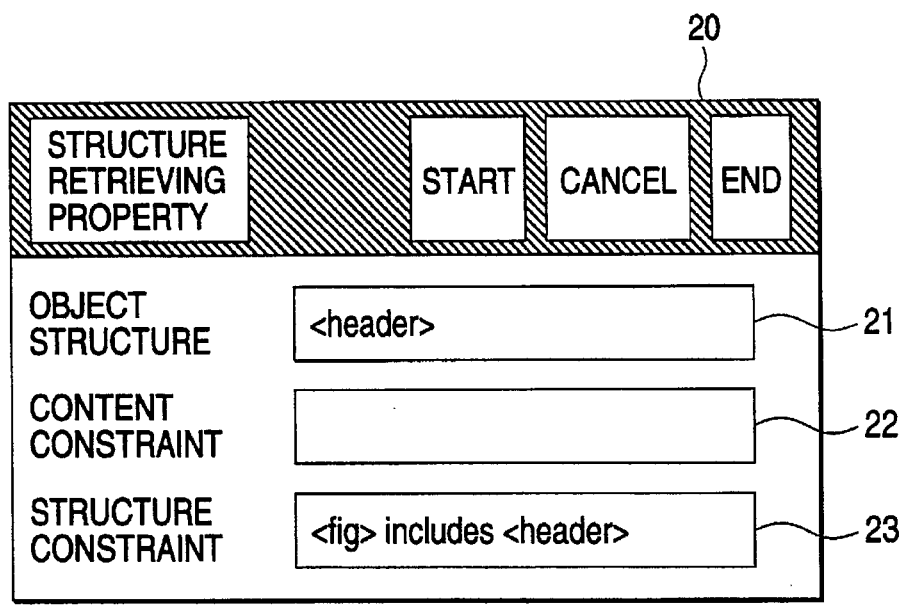
FIG. 2 is a diagram illustrating an example of an operating screen in a case where a structure retrieving instruction is given.

FIG. 2 is a diagram illustrating an example of an operating screen in the case where an instruction for receiving the structure is given. A structure retrieving request from the user or another apparatus or the like opens a subwindow 20 of a structure retrieving property, and a retrieving instruction is given there by designating constraints in retrieving the structure. As for the constraints in the structure retrieval, an object structure is designated by a field 21 for designating an object structure, a constraint of the content is designated by a field 22 for designating a content constraint, and a prescribed condition for constraining the structure is designated by a field 23 for designating a structural constraint. All the constraints in retrieving the structure designated by these three fields may not necessarily be designated, and the retrieval of the structure may be executed by the designation of some constraints. In that case, however, the desired structure is not sufficiently narrowed down, and there is a possibility that many structures satisfying the conditions may be retrieved.

As the structure retrieving instruction 16 having such constraints is given, the structure retrieving section 14 starts the retrieval processing of the structure. Next, a more detailed description will be given of the contents of processing by the structure retrieving section 14. In the basic processing of retrieving the structure by the structure retrieving section 14, the structure (tags) subject to retrieval is accepted from the user or another apparatus, the essential-structure searching section 15 and the structure restoring section 13 are accessed to request processing, and processing is effected in which the partial structure of the restored document is searched for the structure (tags) subject to retrieval, and the retrieved result is returned to the user or the apparatus.

Incidentally, as for the form of the structure retrieving instruction 16 from the user or another apparatus which is delivered to the structure retrieving section 14, an instruction for retrieving the structure is given in the form of a structure retrieving property sheet (FIG. 2) or a command in conformity with the form of the apparatus such as an apparatus whereby the user directly edits a document, such as a word processor or a document editor. In addition, in the case of an apparatus which is connected to a network, e.g., an apparatus such as a retrieval server, its structure retrieving instruction is given by a predetermined protocol through the network from another apparatus. In either case, there is no difference in the contents (constraints of the structure) of the given information in their structure retrieving instruction.

Also, the presentation methods for outputting the retrieved result here are similar in the respective cases. The retrieved result is outputted in conformity with the form of the apparatus such as an apparatus whereby the user directly edits a document, such as a word processor or a document editor. In a document editor or the like, for instance, a presentation method is used wherein a portion which has been found by retrieval is automatically displayed. In the case of a retrieval server connected to a network, an arrangement is provided such that, for example, all the partial structures which were found are sent back to the side which instructed the retrieval.

Figure 3:
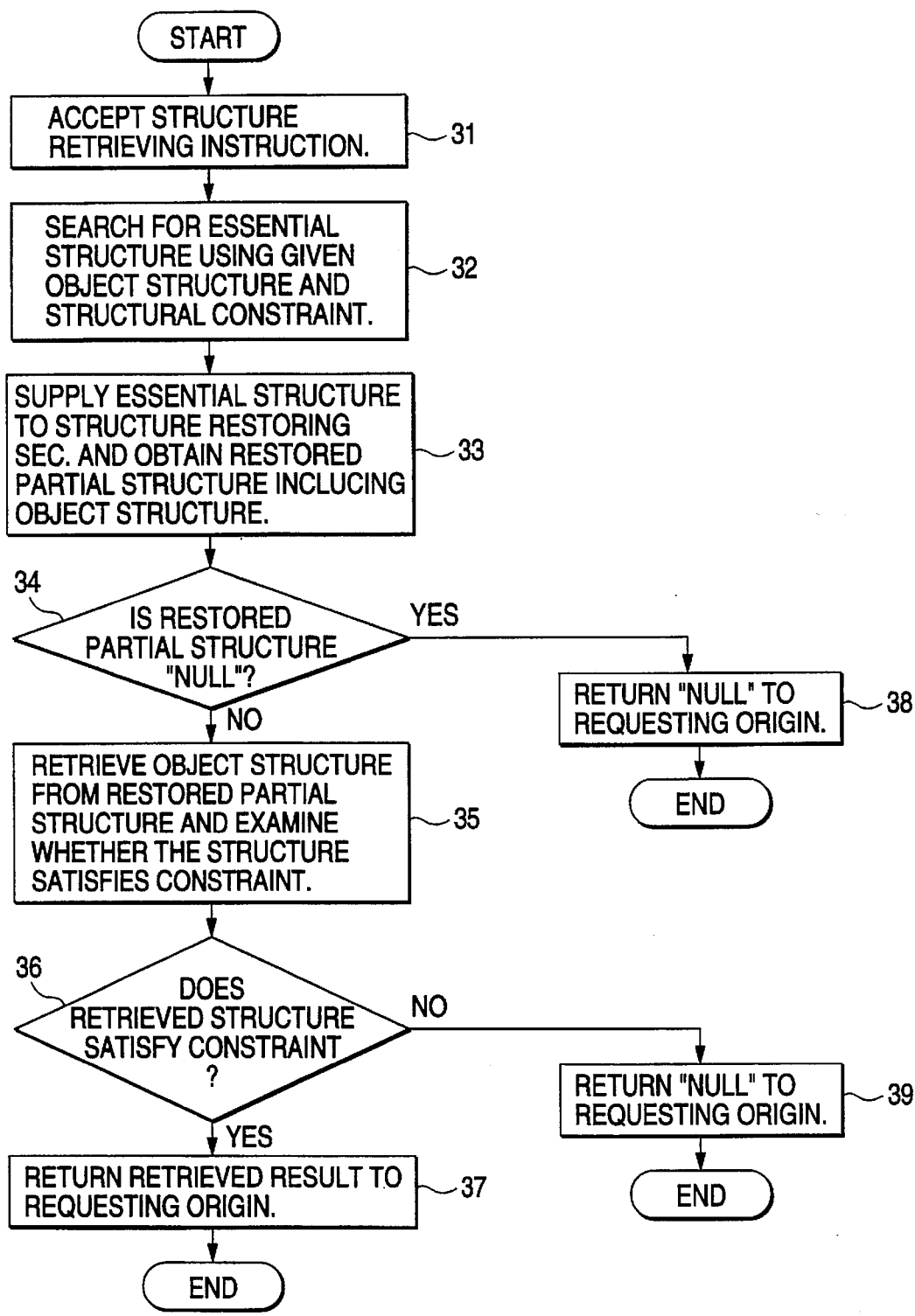
FIG. 3 is a flowchart explaining structure retrieval processing by a structure retrieving section.

FIG. 3 is a flowchart explaining structure retrieval processing by the structure retrieving section 14. Next, referring to the flowchart shown in FIG. 3, a description will be given of the structure retrieval processing by this section. When a structure retrieving instruction (FIG. 2) is given from the outside and processing is started, the structure retrieving instruction is first accepted in Step 31. Then, in Step 32, an essential structure is searched for on the basis of the object structure and the structural constraint of the given retrieving instruction information. In this processing, the information on the object structure and the structural constraint may be delivered to the essential-structure searching section 15, and an essential structure may be obtained from the essential-structure searching section 15. Next, in Step 33, the found essential structure is delivered to the structure restoring section 13 to obtain a restored partial structure including the structure subject to retrieval.

Next, in Step 34, a determination is made as to whether or not the obtained restored partial structure is "NULL." If the restored partial structure is "NULL," it means that the portion concerning the designated structure is not restored, and that the structure the retrieval of which was designated does not exist in the restored structure. Accordingly, the operation proceeds to Step 38 in which "NULL" is returned to the requesting party who made the structure retrieving instruction, and the processing ends. On the other hand, if the obtained restored partial structure is not "NULL" in the determination in Step 34, the structure the retrieval of which was designated by the user is retrieved in the restored partial structure. Therefore, the operation proceeds to Step 35 in which the object structure is retrieved from the restored partial structure, and an examination is made as to whether or not the relevant structure satisfies the constraints (retrieving conditions) designated by the retrieval designation.

That is, in the processing in Step 35, the restored partial structure is searched for the object structure, and an examination is made as to whether or not the result satisfies the constraints (retrieving conditions). If the constraint here is a content constraint, the contents of the text including the structure is checked by text retrieval. If the constraint is a structural constraint, by referring to the document type definition concerning the relevant partial structure stored in the type storing section, the structural definition of the object structure is searched for, and a determination is made as to whether or not that structure satisfies the condition. For example, in the case of a structural constraint such as that the structural constraint exists in a lower portion or at a higher level, the determination can be made depending on whether the found structure is included.

This result is made in an ensuing Step 36, and if it is determined in Step 36 that the retrieved structure satisfies the constraints, the retrieved result is returned to the requesting party in Step 37, and the processing ends. On the other hand, if it is determined in Step 36 that the retrieved structure does not satisfy the constraints, in Step 39 "NULL" is returned to the requesting party who made the retrieving instruction, and the processing ends.

It should be noted that, in the description given here, a description has been given of a processing technique in which a determination is made only once as to whether or not the structure subject to retrieval is included in the document having a restored portion which was restored partially. In actuality, however, there are cases where a plurality of object structures are included. In order to allow the structure retrieval processing to cope with such a case as well, if the restored partial structure is "NULL" in Step 34, it suffices if the processing method is changed to one in which the structure is restored by expanding the range of retrieval to a higher hierarchical level in terms of the hierarchical level of the partial structure to be restored by referring to the document type definition.

In the processing of retrieving an object structure in Step 34 concerning the structure retrieval processing, processing is effected in which the object structure initially designated by the user is retrieved not from a document whose overall structure has been restored but from a document having a partially restored structure. Next, a description will be given of processing in which a text proper portion of the object structure is retrieved from such a partially restored structure.

Figure 4:
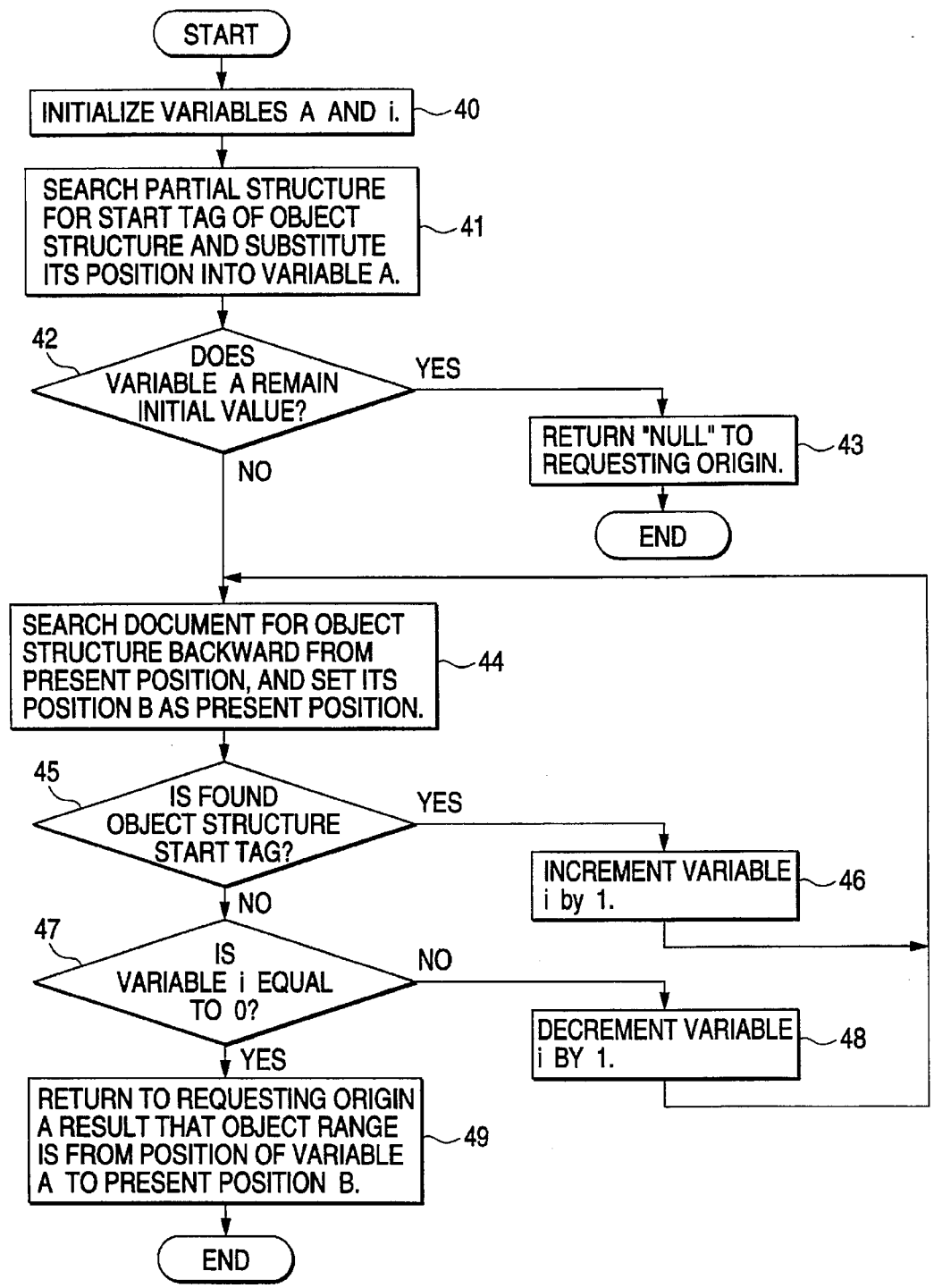
FIG. 4 is a flowchart explaining processing for retrieving an object structure from a partially restored structure.

FIG. 4 is a flowchart explaining the processing for retrieving the object structure from the partially restored structure. In the processing for retrieving the object structure from the partially restored structure, since the structure is represented by tags (e.g., <header> or the like) as marks inserted in the document text, the processing of searching for the tags (structure) is basically carried out by processing similar to ordinary text retrieval processing.

Referring to FIG. 4, a description will be given of the processing for retrieving the object structure from a document having a partially restored structure. When this processing is started, in Step 40, a variable A and a counter i are first initialized (values are reset to "0"). This variable A is a variable for storing the position of a start tag of the object structure in the document text, and the counter i is a variable for controlling the processing with respect to other structures (tags) in a case where the object of retrieval is nested. Next, in Step 41, the partial structure is searched for the start tag of the object structure, and its position is substituted into the variable A. If the object structure is not found, it is assumed that the object structure does not exist in the document, so that a determination is made in an ensuing Step 42 as to whether or not the variable A remains to be the initial value.

If it is determined in Step 42 that the variable A remains to be the initial value, the operation proceeds to Step 43 to return "NULL" to the requesting party, and the processing ends. On the other hand, if it is determined in Step 42 that the variable A has not remained as initialized, it means that the start tag of the object structure has been found in the partially restored document. Next, therefore, a corresponding end tag of the object structure is searched for, and the text proper portion of the object structure is found.

For this reason, next, in Step 44, the object structure (tag) is searched for in the document from the present position (the position of the variable A) onward, and if the object structure is found, that position is set as an ensuing present position. Then, in an ensuing Step 45, a determination is made as to whether or not the object structure thus found is a start tag. If, in this determination, the found object structure is a start tag, it means that a plurality of object structures being retrieved exist, and these object structures are in a nested state, the operation proceeds to Step 46 to determine a proper position of the end tag of the object structure being retrieved. In Step 46, the counter i is incremented by 1, and the operation returns to Step 44 to effect processing again, beginning with Step 44. As a result, the number of start tags of the object structures which exist in the nested state is counted up by the counter i.

Meanwhile, if, in Step 45, the object structure which has been found is not a start tag, the object structure is an end tag, and the end tag of the object structure found here is found first, and a determination is made as to whether or not that end tag corresponds to the start tag of the nested object structure which has been counted by the counter i. For this reason, in an ensuing Step 47, a determination is made as to whether or not the counter i is "0." If, in this determination, the counter i is not "0," it means that the end tag is an end tag of the object structure corresponding to the start tag of the nested object structure which was found before, in which case, the counter i is decremented by 1 in an ensuing Step 48. Then, the operation returns to Step 44, and processing is carried out again, beginning with Step 44. Consequently, the counter i is counted up by the previous processing and is checked, the number of the end tags is counted down by the counter i in correspondence with the start tags of the plurality of object structures in the nested state.

Accordingly, if the value of the counter i is found to be "0" in this Step 47, it is determined that the end tag is a proper end tag corresponding to the start tag of the proper object structure. For this reason, if it is determined in Step 47 that the value of the counter i is "0," the end tag of the object structure found in that case is a proper end tag corresponding to the start tag of the proper object structure. Accordingly, the operation proceeds to Step 49 in which the result that the range from the position of the variable A to the present position B is set as an object range is returned to the requesting party, and the processing ends.

In other words, in this processing for retrieving an object structure, after the start position (the position of A) of the start tag of the object structure is found, a retrieval is further carried out backward in the document to find an end position (the position of B) of the end tag of the object structure. If the end tag (end position) of the object structure is then found during the retrieval, it is sufficient, and the object range is obtained immediately. However, if the start tag of another object structure is found in the meantime, it means that a plurality of object structures exist and are in a nested state, so that processing (processing by the counter i) is effected for finding a correctly corresponding end tag so as to overcome this nested state. Incidentally, as for the form of representation of the tag for representing this structure, since the end tag is unfailingly represented as in the form of </XXX> in correspondence with the start tag <XXX>, the processing of searching for the respective tags is carried out by retrieval processing similar to the text retrieval processing.

Next, a description will be given of processing by the essential-structure searching section 15. On the basis of information on a retrieving instruction delivered from the structure retrieving section 14, the essential-structure searching section 15 performs processing in which a necessary and minimum range of effecting the processing of restoring the document is specified, and that range is delivered to the structure restoring section (via the structure retrieving section). In other words, the essential-structure searching section is used to determine a necessary range of processing in a case where the processing of restoring a document is minimized.

Figure 5:
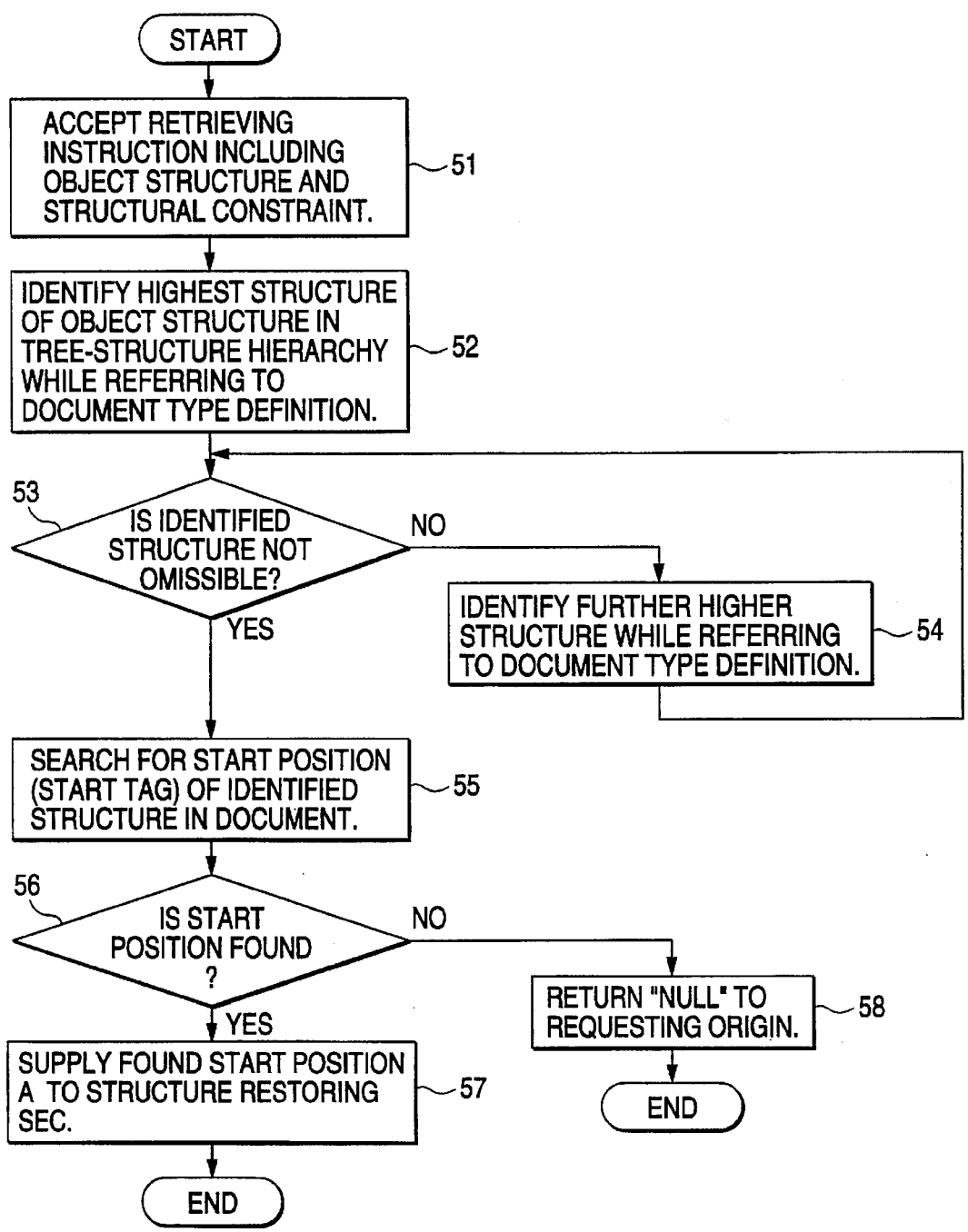
FIG. 5 is a flowchart illustrating a processing flow of an essential-structure searching section.

FIG. 5 is a flowchart illustrating processing by the essential-structure searching section 15. Next, referring to FIG. 5, a description will be given of processing by the essential-structure searching section 15. In this processing by the essential-structure searching section 15, when processing is started, an instruction for retrieval including an object structure and a structural constraint is first accepted in Step 51. Then, in Step 52, referring to a document type definition, a structure of a highest level in the tree-structured hierarchy among the object structures is specified. Then, in Step 53, a determination is made as to whether or not the specified structure is omissible. If the specified structure is not non-omissible, i.e., the structure is omissible, then in an ensuing Step 54 the structure of a second highest level is specified by referring to the document type definition. Then, the operation returns to Step 53 again to repeat the processing beginning with Step 53. As a result, the structure of an immediately higher level whose specified structure is not omissible is unfailingly specified.

If it is determined in Step 53 that the specified structure is not omissible, then in Step 55 a start tag representing a start position in the document is searched for with respect to the specified structure. Then, in an ensuing Step 56 a determination is made as to whether or not the start position of the start tag has been found. If the start position has been found as a result of the determination, the start position which has been found is delivered to the structure restoring section in an ensuing Step 57, and the processing ends. On the other hand, if the start position has not been found in the determination in Step 56, the operation proceeds to Step 58 to return "NULL" to the requesting party, and this processing ends.

Next, a description will be given of the processing by this essential-structure searching section 15 by citing as by way of example elements of a structured document of a specific document text. For example, it is assumed that the object structure of a given retrieving instruction is A, and structural constraints of the object of retrieval include the structural constraints of a structure B and a structure C. In this case, the retrieval of the structure is instructed by imparting to a retrieving expression of the structural constraint given here the following conditional expression:

"A includes (B&C)"

as a constraining condition meaning that "the structure B and the structure C are included in a lower portion of the structure A," or by imparting to the retrieving expression of the structural constraint the following conditional expression:

"A excludes (B|C)"

as a constraining condition meaning that "the structure B or the structure C is not included in the lower portion of the structure A." Incidentally, with respect to a content constraint which is simultaneously given in the retrieving instruction, since it is determined during the retrieval of the text, the content constraint is not processed by the essential-structure searching section.

When such a structure retrieving instruction is given, of the structures (tags) designated in the retrieving instruction, one which is possibly located at a highest level in the tree structure is specified by referring to the document type definition stored in the type storing section. For instance, in the above-described example, the relationship of three types of structures (tags), i.e., the structure A, the structure B, and the structure C, is instructed by the retrieving expression of the retrieving instruction, and, as the document type definition concerning these structures, the document type definition in the type holding section is written as <!ELEMENT doc–O (A,D?)>

<!ELEMENT A–O (B*,C)>

In this case, since it is defined that "the document "doc" is comprised of the structure A and an ensuing structure D which may or may not exist, and the structure A is comprised of the structure B repeated a 0 time or more and the structure C following the same," it is determined that the structure A is possibly located at the highest level.

In other words, under the assumption that the document "doc" here is at the root of the document, a search is carried out starting from the root of the document structure of the tree structure, and it is determined that the structure the structure of a node at a position closest to the root is located at the highest level. In addition, in a case where the document type definition stored in the type storing section is written as listed below, the number of structures located at the highest level cannot be specified as being one, so that, in that case, all the possible structures are set as objects.

<!ELEMENT doc–O (A,B?,D?)>

<!ELEMENT A–O (B*,C)>

<!ELEMENT B–O (A|D)>

In the case of this example, it is determined that there is a possibility that either the structure A or the structure B or both are located at the highest level. That is, in the light of the tree structure of the document structure according to the document type definition, in this case, since the structure A and the structure B are both leaves (children) with respect to the root of the document, and their depths are the same, so that a decision is made that the structure A or the structure B or both are possibly located at the highest level.

Next, by referring to the document type definition concerning the tags of the structures (hereafter referred to as higher-level structures) which are possibly located at the specified highest level, a determination is made as to the possibility of omission of a mark of a start position (start tag) of the structure in the document type definition (specifically, "O O" or the like in the document type definition). Nothing is done if the mark is found to be not omissible as a result of the determination. But if the mark is omissible and there is a possibility of the mark being omitted, the partial structure cannot be positively specified unless an even higher-level non-omissible structure (tag) is specified. Therefore, a high structure of an immediately higher level which is defined as being not omissible is searched for by tracing the structures further higher than that structure (tag).

In the above-described two examples of the document type definition, nothing is done since start tags of both the structure A and the structure B are essential according to the document type definition. On the other hand, in a case where the document type definition is written as follows:

<!ELEMENT doc–O (X,Y,Z?)>

<!ELEMENT X–O (A, E*)>

<!ELEMENT Y–O (B?,E*)>

<!ELEMENT Z–O (A,F*)>

<!ELEMENT A O O #PCDATA>

<!ELEMENT B–O #PCDATA> the start tag of the structure A is omissible. Therefore, the structure X and the structure Z are searched for by tracing structures higher than the structure A. Since the start tags of the found structures X and Z are not omissible and are essential, these structures are set as new higher-level structures (tags). Meanwhile, the start tag of the structure B is non-omissible and essential, so that the structure is set as a higher-level structure (tag) as it is.

With respect to each of the structures that are set as higher-level structures (tags), the document text is searched for the start tags at the start position of the relevant higher-level structure (tag) by the ordinary text retrieval processing, and the start position thus found is substituted into the variable A. If the start position is not found, "NULL" is returned, and the processing ends. The start position of this variable A is delivered from the essential-structure searching section 15 to the structure restoring section 13 as a start position of processing for effecting the partial restoration of the document structure. This step is carried out under control by the structure retrieving section 14.

Figure 6:
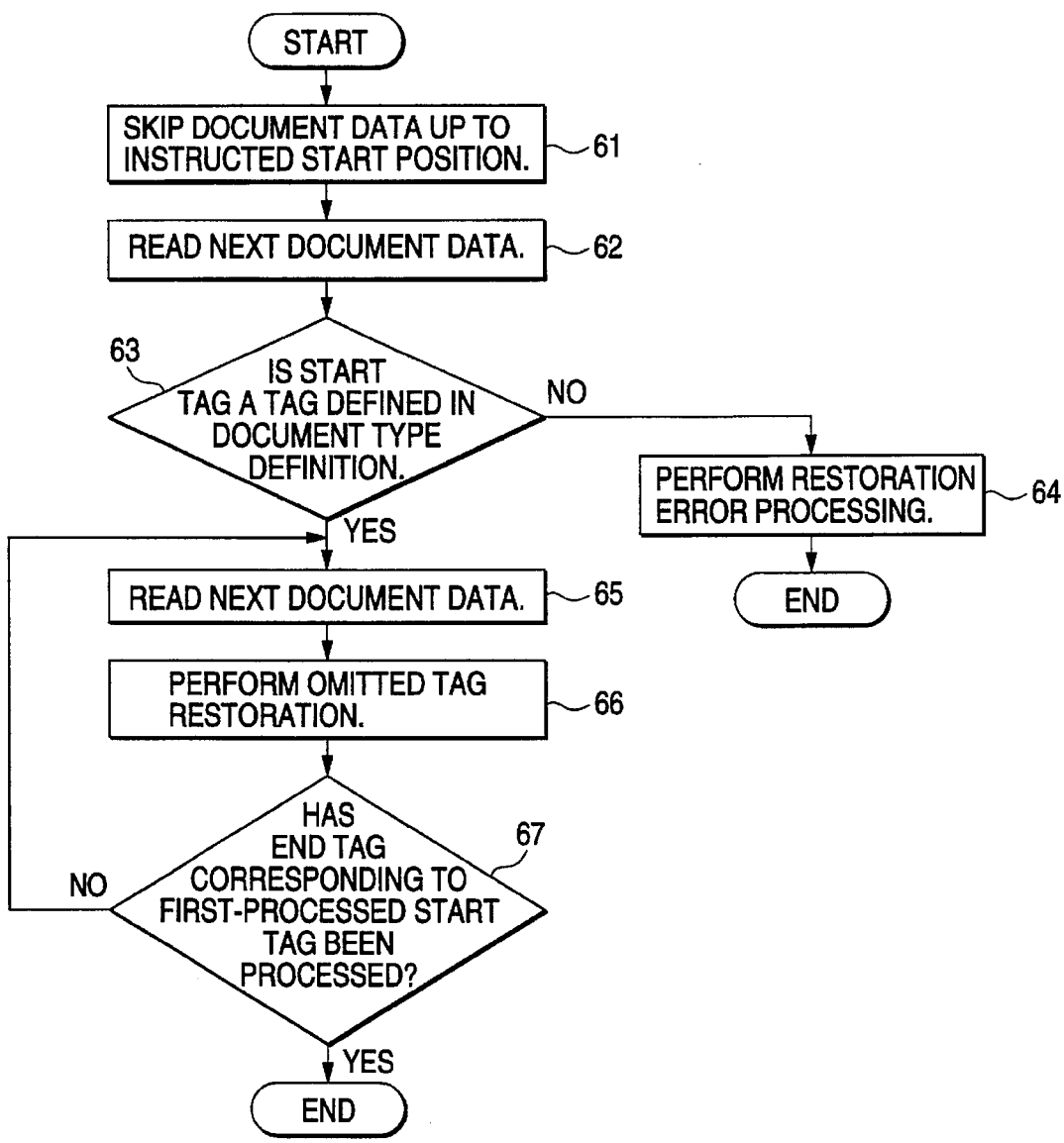
FIG. 6 is a flowchart illustrating a processing flow of a structure restoring section.

Next, a description will be given of processing by the structure restoring section 13. FIG. 6 is a flowchart illustrating a flow of processing by the structure restoring section 13. In the processing of restoring the structure by the structure restoring section 13 here, processing is started from the start position (start tag) delivered thereto from the essential-structure searching section 15, and processing is carried out in which the document structure is partially restored while consecutively reading the document data stored in the document-data storing section 11, under control by the structure retrieving section 14. That is, processing is effected for restoring the structures (tags) which are omitted, starting from the midway in the document (from the designated start position) by referring to the document type definition stored in the type storing section 12. Then, when an end tag corresponding to a first start tag which exists from the start position is processed, the processing ends without restoring the entire remaining structure of the document. The restored document data is delivered as it is to the structure retrieving section 13.

A description will be given by referring to FIG. 6. First, in Step 61, the document data is skipped up to the designated start position. In an ensuing Step 62, the document data is read starting from that position. Next, to determine whether that part of the document to be processed is a proper object of processing, in Step 63, a determination is made as to whether or not the initially processed start tag is a tag defined in the document type definition of that document. If it is determined in Step 63 that the start tag is not a tag defined in the document type definition (stored in the type storing section 12), the operation proceeds to Step 64 to effect the processing of a restoration error.

Meanwhile, if it is determined in Step 63 that the start tag is a tag defined in the document type definition, processing is effected for partially restoring the structure of the document text up to an end tag corresponding thereto. For this reason, the operation then proceeds to Step 65 to read ensuing document data. In an ensuing Step 66, processing is effected for restoring the omitted tag. Then, in an ensuing Step 67, a determination is made as to whether or not an end tag corresponding to the initially processed start tag has been processed. If it is determined in Step 67 that processing has not been completed up to the end tag corresponding to the initially processed start tag, the operation returns to Step 65 to repeatedly carry out the processing from Step 65. On the other hand, if it is determined that processing has been completed up to the corresponding end tag, this processing for partially restoring the structure ends.

Next, a description will be given of a specific example of the processing for partially restoring the structure. For example, it is assumed that the SGML document 140 such as the one shown in FIG. 14 is stored in the document-data storing section 11, and that the position of a tag "<chap>" in the seventh line of the SGML document 140 is given to the structure restoring section 13 as the start position for effecting partial restoration processing. As a result, the structure restoring section 13 starts the restoration processing from the given start position. In the structure restoration processing, processing is carried out while referring to the document type definition 130 such as the one shown in FIG. 13. In this case, since the end tag corresponding to the start tag "<chap>" in the seventh line at the initially processed start position is the end tag "</chap>," the structure restoration processing by the structure restoring section structure restoring section 13 ends when processing has proceeded thus far.

In addition, even in cases where the end tag corresponding to the start tag at the initially processed start position has been omitted, the corresponding end tag is restored by the processing for partially restoring the structure. Hence, the restored omitted end tag is determined so as to determine the end position of the processing for partially restoring the structure.

Figures 7, 8:
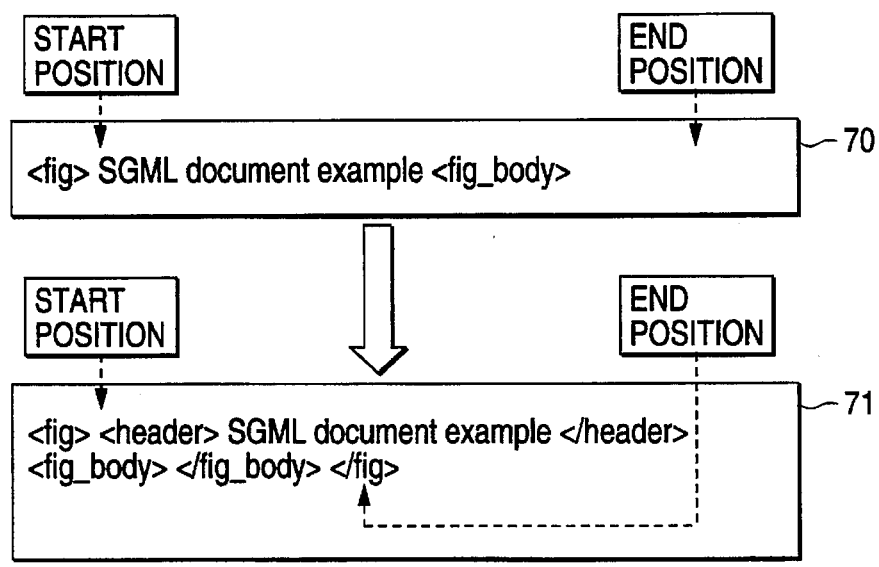
FIG. 7 is a diagram specifically explaining the manner in which a structure of a structured document is partially restored in a case where a corresponding end tag is omitted.
FIG. 8 is a diagram illustrating another form of document type definition stored in a type storing section.

FIG. 7 is a diagram specifically explaining the manner in which the structure of a structured document is partially restored in a case where a corresponding end tag is omitted. Referring to FIG. 7, it is assumed that the position of a start tag "<fig>" whose end tag is omitted has been given to the structure restoring section 13 as a start position of restoration processing in a document 70 prior to processing. As a result, the structure restoring section 13 starts the processing of restoring the structure from the given position with respect to the document 70. In this case as well, the restoration processing proceeds while referring to the document type definition 130 such as the one shown in FIG. 13. In the document 70 prior to restoration, the end tag "</fig>" corresponding to the start tag "<fig>" at the initially processed start position cannot be found. In the structure restoration processing, by referring to the document type definition 130, the start tag "title" omitted immediately after the start tag "<fig>" is first restored, and the end tags "</header>," "</fig_body>," "</fig>" corresponding to the respective start tags are then restored consecutively. As a result, in a document 71 after restoration, this structure restoration processing by the structure restoring section structure restoring section 13 ends when the end tag "</fig>" corresponding to the start tag "<fig>" at the position where processing was started initially is restored.

Next, a description will be given of modifications of the respective processing elements in the structure retrieval apparatus in accordance with this embodiment arranged as described above. FIG. 8 is a diagram illustrating other forms of document type definition stored in the type storing section. As described before, the document type definition 130 (FIG. 13) which is referred to when restoring the structure is stored in the type storing section 12, but the format of the document type definition of information defining the document type may not be one conforming to the requirements of SGML such as the one shown in FIG. 13, and it is possible to use a document type definition 80 of a table type such as the one shown in FIG. 8. In cases where the document type definition is stored in the type storing section 12, if such a table-type format is used, there is an advantage in that the content information can be accessed at high speed with respect to each item regulating a tag (structure). Here, the contents of the document type definition 80 of the table type shown in FIG. 8 are made identical to those of the document type definition 130 shown in FIG. 13 for comparison's sake.

Figure 9:
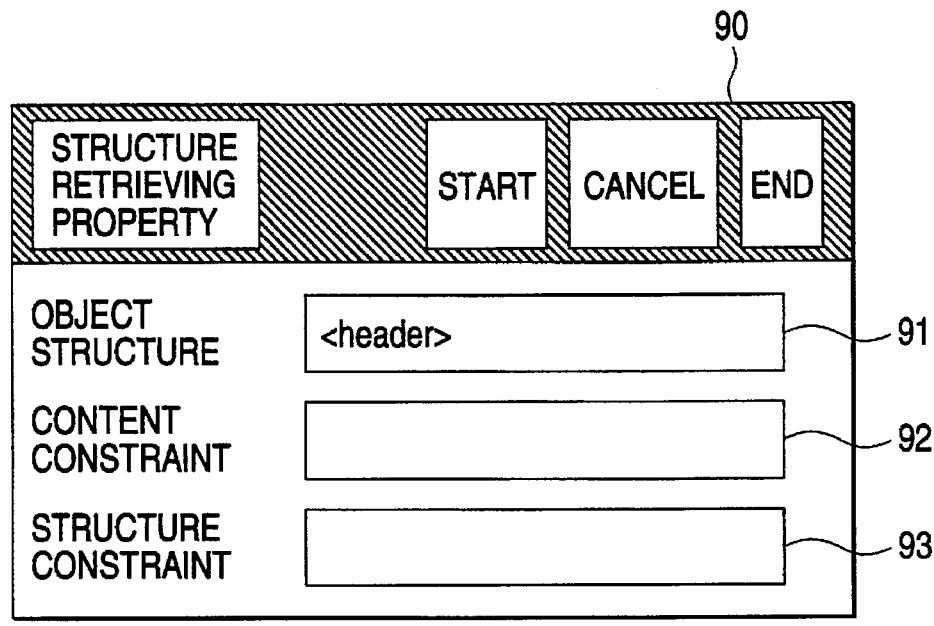
FIG. 9 is a diagram illustrating another example of the structure retrieving instruction.
Figure 10:
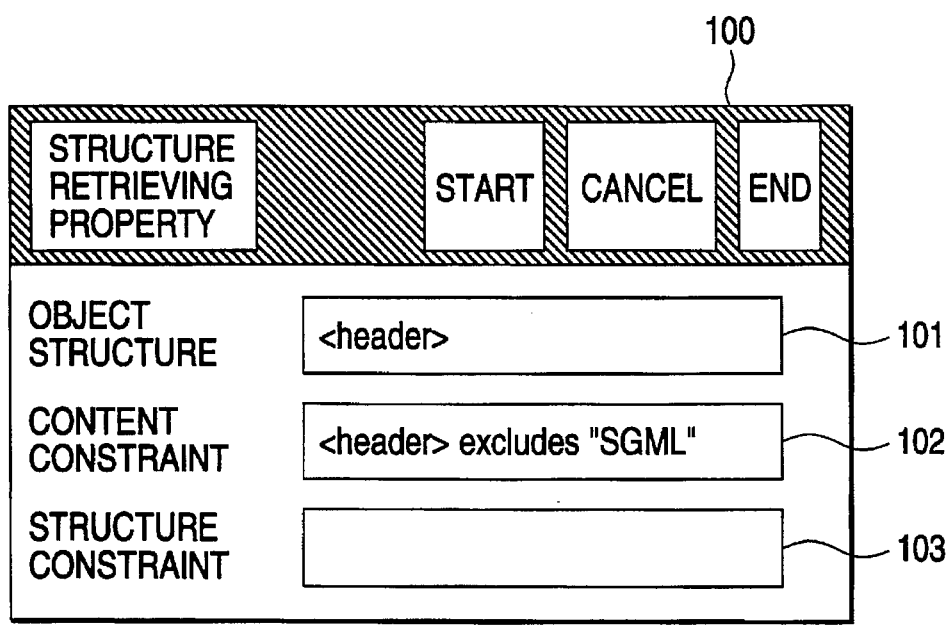
FIG. 10 is a diagram illustrating still another example of the structure retrieving instruction.

FIGS. 9 and 10 are diagrams illustrating other examples of an instruction for retrieving a structure. As described above, a structure retrieving instruction which is provided from a user or another apparatus is given by stating a tag indicating an object structure to be retrieved, or by stating a constraint concerning its structure or content, as required. In this case, the structure retrieving instruction may be given by stating the element itself of the document subject to retrieval or the item of the document type definition to which the document subject to retrieval conforms, or by stating an identifier (a group of identifiers) thereof. In such a structure retrieving instruction, constraints concerning the content or structure are given to further specify the structure subject to retrieval. For example, an instruction may be given as "the structure (tag) '<header>' including the character string 'SGML'."

As shown in FIG. 2, an instruction for retrieving a structure is given by a designation (21) of an object structure and a designation (23) of a constraint concerning the structure by using the subwindow 20 of the structure retrieving property. Alternatively, it is possible to instruct retrieval by designating (at 81) only the object structure which is an object of retrieval, as shown in a subwindow 90 of the structure retrieving property shown in FIG. 9. Still alternatively, a structure retrieving instruction may be given by designating (at 101) an object structure and by further designating (at 102) a constraint concerning the content, as shown in a subwindow 100 of the structure retrieving property shown in FIG. 10.

As shown in FIGS. 2, 9 and 10, the fields 21 to 23, 91 to 93, and 101 to 103 for designating respective constraints in instructions for retrieving structures, the words "excludes" and "includes" written in the constraining conditions are reserved words, for stating the relationship of constraints of the character string or structure of the text. Other reserved words for stating the relationship of constraints of this type include "=" (is completely equal to), "&" (is in AND relationship with), "|" (is in OR relationship with), "sequence" (consists of sequentially arranged items of), "repeat" (consists of a repetition of), and the like. As methods of describing constraints, a number of methods are already known such as the methods described in Japanese Patent Application Laid-Open No. 5-135054. Since it is sufficient to use them, a description thereof will be omitted here.

In addition, in the syntactic analysis of a structured document by the structure restoring section or the structure retrieving section, it is possible to use techniques of syntactic analysis processing used in a compiler for translating a known programming language for a computer or in natural language processing. In practice, with respect to the processing of a SGML document, it is possible to use "Mark-It" developed by Belgium's SemaGroup or a processing system called "sgmls" prepared by SGML Users Group and distributed as freeware. By using such software, the structure restoring section for effecting the restoration processing of the tags by performing syntactic analysis of SGML documents can be readily configured through a partial modification of the processing content.

That is, since such software has been prepared so as to effect the batch processing of the SGML document as a whole, an alteration is made in such a manner as to effect partial restoration processing by delivering the start position of processing with respect to the document as in this embodiment. Namely, if the class of the grammar used for describing the definition of the document type for regulating the document structure is context-free grammar, the process (context) leading to a certain structure (tag) does not affect constraints subsequent to it, so that an adequate measure can be provided without the occurrence of drawbacks in the operation of the processing system even if the processing content is partially modified.

To give a specific description, in a case where a processing system such as Mark-it or sgmls is used, an adequate measure can be provided if the processing content is partially modified with respect to the four items that are described below.

1) First, the portion which is programmed in such a way to unconditionally effect the restoration processing of tags from the beginning of the document is modified to effect processing from a designated start position, so as to allow a start position (a pointer indicating a position in a document file) to be designated from the outside. For this reason, as initial processing in the processing system, the processing of "skipping the document file up to a designated start position" is added, and the reading of the data is started from that position.

2) Since the start tag to be initially processed is programmed so as to be inevitably a start tag corresponding to the root of the document (otherwise the case is processed as an error), that portion of programming is modified such that if the tag is one defined in the type storing section (i.e., DTD), the case will not be processed as an error even if processing is started with an arbitrary tag. For this reason, the portion which performs processing such that "the case is processed as an error unless the initially processed start tag is the tag of the root of the document" in the initial step of processing is revised such that "the case is processed as an error unless the initially processed start tag is a tag defined in the document type definition (stored in the type storing section)."

3) The portion which is programmed such that "since the start tag to be initially processed is the start tag of the root, a determination is made as to whether an end tag corresponding thereto has been processed, and if the processing has not been completed, the processing is continued" is modified such that "the processing is continued depending on whether the end tag corresponding to the initially processed start tag has been processed." More specifically, the processing in which "if the end tag of the root has been processed, restoration processing is continued and, if not, ensuing processing is effected" in a latter half of restoration processing is modified such that "if the end tag corresponding to the initially processed start tag has been processed, restoration processing is continued and, if not, the processing ends."

4) Further, the portion which is programmed such that "since the start tag to be initially processed is the start tag of the root, if data still remains in a remaining portion of the document after an end tag corresponding thereto has been processed, the case is processed as an error" is modified such that "even if data remains after the end tag corresponding to the initially processed start tag has been processed, the case is not processed as an error." Specifically, since there is a portion which effects processing in which "if document data remains, the case is processed as an error" in a final step of the processing, this portion is removed.

Next, a description will be given of another embodiment of the structure retrieval apparatus in accordance with the present invention. Although the structure retrieval apparatus in accordance with the above-described first embodiment is arranged by including the essential-structure searching section in the structure retrieving section, the essential-structure searching section in the structure retrieving section may be provided separately. In addition, the structure retrieving section upon accepting a structure retrieving instruction is arranged such that a necessary and minimum portion of a structured document including the structure to be retrieved is determined by the essential-structure searching section, the structure is partially restored by the structure restoring section, and the structure subject to retrieval is retrieved by means of the restored partial data. However, an arrangement may be provided such that the control of such processing is carried out efficiently by a separately provided control section, so as to efficiently perform processing with respect to a request of instruction for retrieving a plurality of structures. Next, a description will be given of such a modification.

Figure 11:
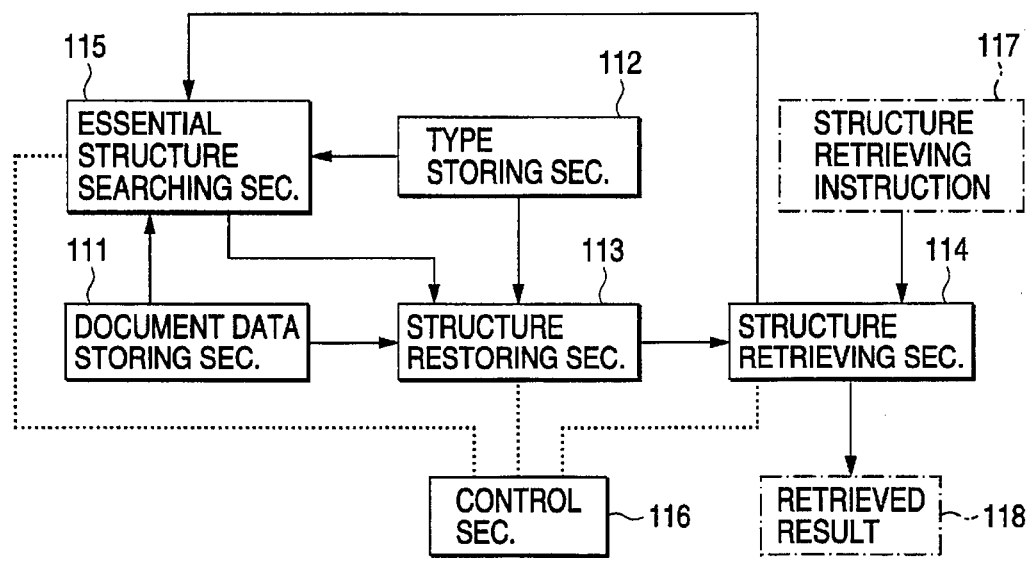
FIG. 11 is a block diagram illustrating a configuration of a structure retrieval apparatus in accordance with a second embodiment of the present invention.

FIG. 11 is a block diagram illustrating a configuration of a structure retrieval apparatus in accordance with a second embodiment of the present invention. In FIG. 11, reference numeral 111 denotes a document-data storing section; 112, a type storing section; 113, a structure restoring section; 114, a structure retrieving section; 115, an essential-structure retrieving section; and 116, a control section. In addition, numeral 117 denotes a structure retrieving instruction, and 118 denotes a retrieved result.

In the structure retrieval apparatus in accordance with the second embodiment as well, as described before, a retrieving request from the user or an other apparatus is designated as the structure retrieving instruction 117 in a format such as the one shown in FIG. 2, and retrieving instruction information consisting of an object structure, a content constraint, and a structural constraint is imparted to the structure retrieving section 114 so as to start processing for retrieving the structure. In the control of this retrieval processing, the control section 116 controls respective sections to carry out processing. When the structure retrieval processing is started, the structure retrieving section 114 delivers information on the object of retrieval contained in the retrieving request to the essential-structure searching section 115.

The essential-structure searching section 115 searches for a definition concerning the structure (tag) subject to retrieval by referring to the document type definition (DTD) stored in the type storing section 112. If the relevant structure (tag) is represented as being omissible in the definition concerning the structure (tag) subject to retrieval which has been found, a document structure defined in the document type definition (DTD) in the type storing section 112 is searched so as to specify a non-omissible structure (tag) at a level higher than that of the structure (tag) subject to retrieval. Then, by using the structure (tag) specified here as a reference point, the partial restoration of the document structure is effected by the structure restoring section 113.

For this reason, the essential-structure searching section 115 searches for the non-omissible structure (tag) specified earlier from the document data stored in the document-data storing section 111, and if it is found, the essential-structure searching section 115 delivers the non-omissible structure (tag) and the position of the relevant structure (tag) in the document data to the structure restoring section 113.

From the non-omissible structure (tag) and the position of the relevant structure (tag) in the document data thus received, the structure restoring section 113 effects the restoration processing of the document structure in the document data from that position. That is, the structure in which the document structure of the document data has been omitted is restored by using the given position as a position of a processing start. Consequently, only the structure (tag) of the lower structure from the position of the designated structure of the structured document is restored by the structure restoring section 113 while reading the information on the document type definition stored in the type storing section 112. The partial structure of the structured document as a result of restoration processing is delivered to the structure retrieving section 114.

The structure retrieving section 114 searches the partially restored partial document structure (FIG. 7) delivered thereto for the structure (tag) subject to retrieval designated by the user or another apparatus. The result is returned as the retrieved result 118 to the user or apparatus, i.e., the party which issued the request of instruction for structure retrieval.

It should be noted that the request for structure retrieval from the user or another apparatus or the like may be given together with the document subject to retrieval or the document type definition to which the document subject to retrieval conforms. In that case, the data on the document subject to retrieval is read by and stored in the document-data storing section 111, while the document type definition to which the document subject to retrieval conforms is read by and stored in the type storing section 112. In addition, the document subject to retrieval and the document type definition may not be provided simultaneously, and may be provided separately. That is, an arrangement may be provided such that the document type definition stored in the type storing section 112 is stored in advance as internal data, and only the document subject to retrieval is provided from the outside. Alternatively, an arrangement may be provided such that, conversely, the document subject to retrieval is stored in advance as internal data, and only the document type definition is provided from the outside.

In the structure retrieval apparatus in accordance with the second embodiment, the document of the partial structure whose structure has been partially restored by the structure restoring section 113 is delivered as it is to the structure retrieving section 114. However, if the document whose structure has been partially restored is replaced with a corresponding portion persisting prior to restoration processing and stored in the document-data storing section, in cases where a request for retrieving the structure of the same portion is made in a subsequent instruction for retrieving a structure, the document of the structure which was partially restored before can be used in retrieval. Consequently, in the subsequent retrieval of structures, there are cases where it is unnecessary to effect the structure retrieval processing, with the result that the substantial retrieval time can be shortened. Next, a description will be given of such a modification as a third embodiment.

Figure 12:
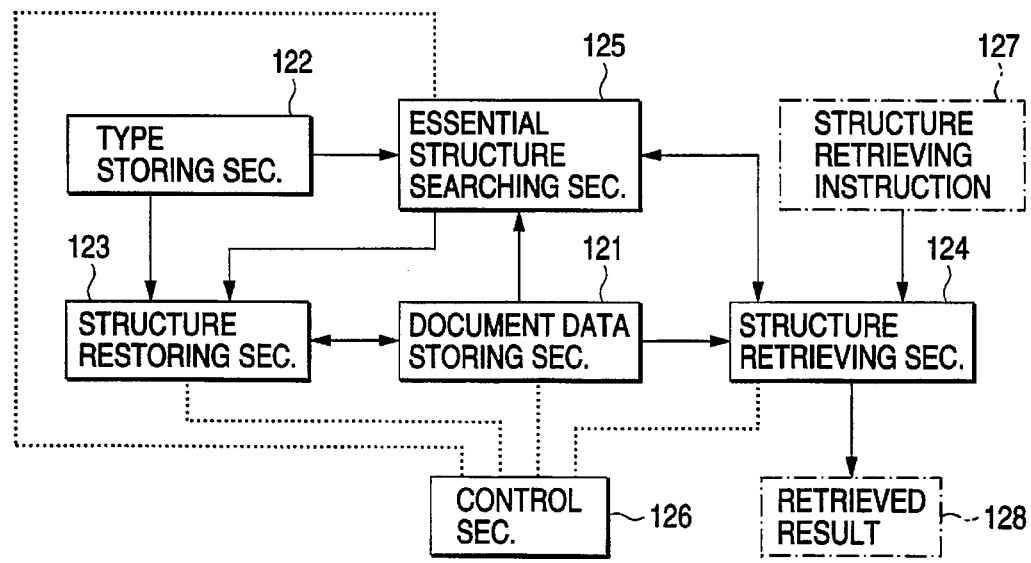
FIG. 12 is a block diagram illustrating a configuration of a structure retrieval apparatus in accordance with a third embodiment of the present invention.

FIG. 12 is a block diagram illustrating a configuration of a structure retrieval apparatus in accordance with the third embodiment of the present invention. In FIG. 12, reference numeral 121 denotes a document-data storing section; 122, a type storing section; 123, a structure restoring section; 124, a structure retrieving section; 125, an essential-structure retrieving section; and 126, a control section. In addition, numeral 127 denotes a structure retrieving instruction, and 128 denotes a retrieved result.

In the structure retrieval apparatus in accordance with the third embodiment as well, as described before, a retrieving request from the user or an other apparatus is designated as the structure retrieving instruction 127 in a format such as the one shown in FIG. 2, and retrieving instruction information consisting of an object structure, a content constraint, and a structural constraint is imparted to the structure retrieving section 124 so as to start processing for retrieving the structure. In the control of this retrieval processing as well, the control section 126 controls respective sections to carry out processing. When the structure retrieval processing is started, the structure retrieving section 124 delivers information (object structure) on the object of retrieval contained in the retrieving request to the essential-structure searching section 125.

The essential-structure searching section 125 searches for a definition concerning the structure (tag) subject to retrieval by referring to the document type definition (DTD) stored in the type storing section 122. If the relevant structure (tag) is represented as being omissible in the definition concerning the structure (tag) subject to retrieval which has been found, a document structure defined in the document type definition (DTD) in the type storing section 122 is searched so as to specify a non-omissible structure (tag) at a level higher than that of the structure (tag) subject to retrieval. Then, by using the structure (tag) specified here as a reference point, the partial restoration of the document structure is effected by the structure restoring section 123.

For this reason, the essential-structure searching section 125 searches for the non-omissible structure (tag) specified earlier from the document data stored in the document-data storing section 121, and if it is found, the essential-structure searching section 125 delivers the non-omissible structure (tag) and the position of the relevant structure (tag) in the document data to the structure restoring section 123.

Thus, in the structure retrieval apparatus in accordance with the third embodiment as well, in the same way as the structure retrieval apparatus in accordance with the second embodiment, the structure retrieving instruction 127 from the user or another apparatus or the like is imparted to the structure retrieving section 124, and when the structure retrieving section 124 delivers the structure (tag) subject to retrieval contained in the structure retrieving instruction 127 to the essential-structure searching section 125, the essential-structure searching section 125 searches for a non-omissible structure (tag) at an immediately higher level than that of the structure (tag) subject to retrieval, and delivers to the structure restoring section 123 information on the non-omissible structure (tag) and the position of the document data where the structure (tag) is located in the document. In addition, the essential-structure searching section 125 delivers the information to the structure restoring section 123, and at the same time returns the same information to the structure retrieving section 124 as well.

The structure restoring section 123 starts partial restoration processing from the received position in the document, and executes the restoration processing of only the lower structure concerning the structure (tag) while reading the document type definition from the type storing section 122. The result of partial restoration processing is delivered to the document-data storing section 121, and is replaced by a corresponding portion in the relevant document and is rewritten.

Meanwhile, the structure retrieving section 124 which has received the information from the essential-structure searching section 125 monitors the document-data storing section 121, and waits for the document information to be rewritten by the structure restoring section 123. When the rewriting of the document is completed as a result of the partial restoration processing, the structure retrieving section 124 reads the structure (tag) which was initially the object of retrieval from the document-data storing section 121 on the basis of the information on the in-document position of the non-omissible structure (tag) received from the essential-structure searching section 125, and effects retrieval of the object structure. The result is returned as the retrieved result 128 to the user or apparatus, i.e., the party which issued the request of instruction for structure retrieval.

Thus, in the third embodiment as well, the substantial retrieval time can be shortened since the structure (tag) subject to retrieval can be retrieved by effecting partial restoration processing of the structure on the basis of necessary and minimum partial data concerning the relevant structure (tag) by using the structure restoring section 123 on the basis of the found structure (tag) by using the essential-structure searching section 125 under control by the control section 126. For this reason, the structure retrieval can be effected at high speed. In addition, since the data in which the tag subject to retrieval is partially restored in consecutively rewritten by and stored in the document-data storing section 121 each time the structure retrieval is carried out, there are cases where the structure retrieval processing need not be performed in the subsequent structure retrieval, with the result that the substantial retrieval time can be shortened.

As described above, although the present invention has been described with reference to three embodiments, a number of modifications are possible in the combination of processing elements in carrying out the present invention. The characteristic feature of the structure retrieval apparatus in accordance with the present invention lies not in the flow of data between such processing elements but in that only the portion necessary for the structure retrieval is subjected to partial restoration processing of the structure to effect structure retrieval, so as to shorten the structure retrieval time. In addition, when a structured document subject to retrieval is stored, the overall document is not restored in one process and converted into its internal structures, but the document data is stored in the original form of the document, and when the document data is made an object of retrieval, necessary and minimum restoration processing is executed by minimizing the range of structure retrieval processing, thereby reducing the retrieval time as a whole.

In terms of the basic viewpoint of the present invention, the structure restoration processing is not carried out with respect to the entire object document for effecting the structure retrieval processing, but a portion which requires the structure restoration processing is specified on the basis of the object structure specified by the user as an object of retrieval and the document type definition concerning the document subject to retrieval, and the restoration processing is carried out with respect to only the specified necessary portion, thereby to minimize the processing time. Specifically, the essential-structure searching section is provided for searching for a structure (tag) which is located at a higher level than that of the structure (tag) subject to retrieval in the document structure and whose structure (tag) is not omissible. As a primary retrieval, the document is searched for the non-omissible structure (tag) found by the essential-structure searching section. The partial restoration processing of the structure is effected with respect to only the partial structure found as a result. Then, on the basis of that result of processing, the original structure (tag) subject to retrieval is searched for as a second retrieval. Consequently, when a retrieval is carried out for the original document data, it is unnecessary to apply the restoration processing to the entire document in order to carry out retrieval, thereby making it possible to effect the structure retrieval processing at high speed.

Such a structure retrieval apparatus of the present invention can not only be used as the function of retrieving a partial structure of a document as a part of a document processor such as a document editing apparatus (such as a word processor) in a workstation, but can also be used in document processing apparatuses for effecting the retrieval of document structures as in a service function connected to a network in which the partial structure of a structure document is automatically retrieved and the result is returned. In addition, the object of structuring is not confined to documents, and may be, for instance, a database having a structure. Furthermore, although in the embodiments a description has been given of an example in which the object represented by data is a document, the present invention can be effectively implemented if the object is not a document insofar as the representation of the data conforms to the format described herein.

What is claimed is:

1. A structure retrieval apparatus comprising:

data storing means for storing data which incorporates tags each discriminating a portion of the data to express a structure of the data, part of the tags being omissible;

type storing means for storing a pattern of the data structure expressed by the tags;

essential structure searching means for identifying a minimum necessary range of the data in which range omitted tags should be restored, based on a structure retrieving instruction including an object structure;

structure restoring means for restoring the omitted tags in the minimum necessary range to thereby produce a partial retrieved data; and structure retrieving means for retrieving a tag of the object structure from the partial retrieved data.

2. The structure retrieval apparatus of claim 1, wherein when the tag of the object structure is omissible, the essential structure searching means searches the pattern of the data structure for a non-omissible tag of a higher rank than the tag of the object structure.

3. The structure retrieval apparatus of claim 1, wherein the partial retrieved data is substituted for a corresponding partial data of the data stored in the data storing means.

* * * * *